(12) United States Patent
Iwamoto

(10) Patent No.: US 7,689,688 B2
(45) Date of Patent: Mar. 30, 2010

(54) MULTIPLE-APPLICATION TRANSACTION MONITORING FACILITY FOR DEBUGGING AND PERFORMANCE TUNING

(75) Inventor: Arihiro Iwamoto, Kawasaki (JP)

(73) Assignee: International Business Machines Corporation, Armonk, NY (US)

(*) Notice: Subject to any disclaimer, the term of this patent is extended or adjusted under 35 U.S.C. 154(b) by 544 days.

(21) Appl. No.: 11/614,771

(22) Filed: Dec. 21, 2006

(65) Prior Publication Data

US 2008/0155560 A1   Jun. 26, 2008

(51) Int. Cl.
*G06F 9/44* (2006.01)
(52) U.S. Cl. .................... 709/224; 709/223; 709/201
(58) Field of Classification Search ............... 709/224, 709/201, 223
See application file for complete search history.

(56) References Cited

U.S. PATENT DOCUMENTS

| | | | |
|---|---|---|---|
| 6,363,477 B1* | 3/2002 | Fletcher et al. | 713/151 |
| 2005/0021708 A1* | 1/2005 | Raghuraman et al. | 709/223 |
| 2005/0138111 A1* | 6/2005 | Aton et al. | 709/201 |
| 2006/0130070 A1* | 6/2006 | Graf | 719/318 |

* cited by examiner

*Primary Examiner*—Wing F Chan
*Assistant Examiner*—Ruolei Zong
(74) *Attorney, Agent, or Firm*—Kunzler Needham Massey & Thorpe

(57) ABSTRACT

A system, method, and program product is disclosed to monitor multiple applications, each application configured to process part of a TCP/IP-based transaction. The applications communicate with one another by way of a TCP/IP protocol. Each application is further configured to generate one or more events associated with the TCP/IP-based transaction. Each application has associated therewith an event management module configured to acquire and deliver event information associated with their respective events to an event bus, to minimize overhead in managing the events. A monitoring module communicates with the event bus to receive and organize the event information to provide an integrated end-to-end view of the TCP/IP-based transaction.

20 Claims, 4 Drawing Sheets

| Event | 110a |
|---|---|
| Event Name | 200 |
| Event Content | 202 |
| IP Address of the Operating Machine | 204 |
| Application Name | 206 |
| Transaction ID in the Application | 208 |
| Time Stamp | 210 |
| Arbitrary Information | 212 |
| Other | 214 |

Fig. 2A

| Event | 110b |
|---|---|
| Event Name | 200 |
| Event Content | 202 |
| IP Address of the Operating Machine | 204 |
| Application Name | 206 |
| Transaction ID in the Application | 208 |
| Time Stamp | 210 |
| Source IP Address | 216 |
| Source Port Number | 218 |
| Target IP Address | 220 |
| Target Port Number | 222 |
| Arbitrary Information | 212 |
| Other | 214 |

Fig. 2B

| Alerts | 126 |

| Time between Events Exceeds Selected Time | 300 |

| Average, Maximum, and Minimum Time between Events Exceeds Selected Time | 302 |

| Transaction Processing Time Exceeds Selected Time | 304 |

| Average, Maximum, and Minimum Transaction Processing Times Exceed Selected Time | 306 |

| Transaction Production Rate Falls below Selected Rate | 308 |

| Average, Maximum, and Minimum Transaction Production Rates Fall below Selected Rate | 310 |

| Other | 312 |

Fig. 3

| Statistical Data | 128 |
|---|---|
| Processing Time between Events | 400 |
| Average, Maximum, and Minimum Processing Times between Events | 402 |
| Transaction Processing Time | 404 |
| Average, Maximum, and Minimum Transaction Processing Times | 406 |
| Transaction Production Rate | 408 |
| Average, Maximum, and Minimum Transaction Production Rates | 410 |
| Other | 412 |

MULTIPLE-APPLICATION TRANSACTION MONITORING FACILITY FOR DEBUGGING AND PERFORMANCE TUNING

BACKGROUND OF THE INVENTION

1. Field of the Invention

This invention relates to systems and methods for monitoring transactions and more particularly to systems and methods for monitoring transactions processed by multiple applications over a TCP/IP protocol.

2. Description of the Related Art

In a service-oriented architecture (SOA) or other similar architecture, it is often difficult to obtain a complete picture of events that occur when a transaction is processed by multiple applications. While various techniques may be used to monitor the performance of applications individually, there are few if any efficient approaches to view the overall performance of applications in the SOA or other similar architecture. Moreover, a user or administrator may be unable to analyze the performance of specific transactions as they flow through one or more networks of connected systems and applications. These problems make it difficult and time-consuming to debug or tune the performance of applications in an SOA. For example, it would be difficult to identify and correct bottlenecks in the system without more comprehensive information.

Currently, data logs may be generated to provide a record of events for each separate application in an SOA or similar architecture utilizing multiple applications communicating by way of a TCP/IP protocol. Because these data logs may be application specific, however, they may not provide a complete comprehensive view of the system or enable end-to-end analysis of transactions as they flow through the system. To obtain a more complete picture, an individual may need to manually obtain and compare logs from each application, a task that can be both tedious and inefficient.

In view of the foregoing, what are needed are systems and methods for monitoring transactions processed by multiple applications in an SOA or other similar architecture. Ideally, such systems and methods would provide a comprehensive end-to-end view of transactions processed by multiple applications, enabling a user to more easily debug and tune a multiple-application system.

SUMMARY OF THE INVENTION

The present invention has been developed in response to the present state of the art, and in particular, in response to the problems and needs in the art that have not yet been fully solved by currently available systems and methods. Accordingly, a system, program product, and method to monitor transactions that require processing by multiple applications in communication by way of TCP/IP connections are disclosed.

In one aspect of the invention, a system includes multiple applications, each configured to process part of a TCP/IP-based transaction. The applications communicate with one another by way of a TCP/IP protocol. Each application is further configured to generate one or more events associated with the TCP/IP-based transaction. Each application has associated therewith an event management module configured to acquire and deliver event information associated with their respective events to an event bus. A monitoring module communicates with the event bus to receive and organize the event information to provide an integrated end-to-end view of the TCP/IP-based transaction. In selected embodiments, the monitoring module may receive information from the event bus by querying the event bus.

In certain embodiments, the event information may be stored and transmitted in the form of XML documents. Similarly, the event information may include various types of information including but not limited to an event name, the content of an event, an IP address of a machine processing the transaction, a name of an application associated with an event, a transaction ID, a time stamp, a source IP address, a source port number, a target IP address, a target port number, as well as other information about an application generating an event.

In certain embodiments, the monitoring module may be characterized by an online mode wherein the monitoring module monitors information on the event bus in real time. In such a mode, the monitoring module may be configured to generate an alert when a transaction processing time exceeds a selected time, a selected event occurs, time between events exceeds a selected time, a transaction processing rate falls below a selected rate, or the like.

In other embodiments, the monitoring module may be characterized by a batch mode wherein the monitoring module generates statistical data of events and transactions monitored by the event bus over time. Such statistical data may include, for example, the individual, average, maximum, and minimum processing times between events, processing times for transactions, transaction processing rates over time, number of transactions exceeding a selected processing time, or the like.

In certain embodiments, the monitoring module may be configured to generate the integrated end-to-end view of the TCP/IP-based transaction by correlating one or more of a target IP address and a target port number of the first event information with one or more of a source IP address and a source port number of the second event information.

In another aspect of the invention, a program product including a computer readable medium storing a computer-readable program is disclosed to monitor transactions requiring processing by multiple applications. When executed, this program causes a computer to process a TCP/IP-based transaction with multiple applications, with each application processing a part of the TCP/IP-based transaction and generating an event at the beginning and end of the part processed by the application. Execution of the program further causes the computer to acquire event information associated with each of the events and transmit the event information to an event bus. The event information is then received from the event bus and organized to provide an integrated end-to-end view of the TCP/IP-based transaction processed by the applications.

In another aspect of the invention, a method to monitor transactions that require processing by multiple applications includes processing, by several applications, parts of a TCP/IP-based transaction. These applications communicate with one another by way of a TCP/IP protocol and generate one or more events associated with the TCP/IP-based transaction. The method further includes acquiring event information associated with each of the events and transmitting the event information to an event bus. The event information is then received from the event bus and organized to provide an integrated end-to-end view of the TCP/IP-based transaction processed by the applications.

The present invention provides a novel system, program product, and method to monitor transactions that require processing by multiple applications. The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through the use of the accompanying drawings, in which:

FIG. 2A is a block diagram showing various types of event information that may be transmitted to an event bus in accordance with the invention;

FIG. 2B is a block diagram showing additional types of event information that may be transmitted to an event bus in accordance with the invention;

FIG. 3 is a block diagram showing various types of alerts that may be generated by a monitoring module in accordance with the invention; and FIG. 4 is a block diagram showing various types of statistical data that may be gathered by a monitoring module in accordance with the invention.

DETAILED DESCRIPTION OF THE INVENTION

Figure 1:
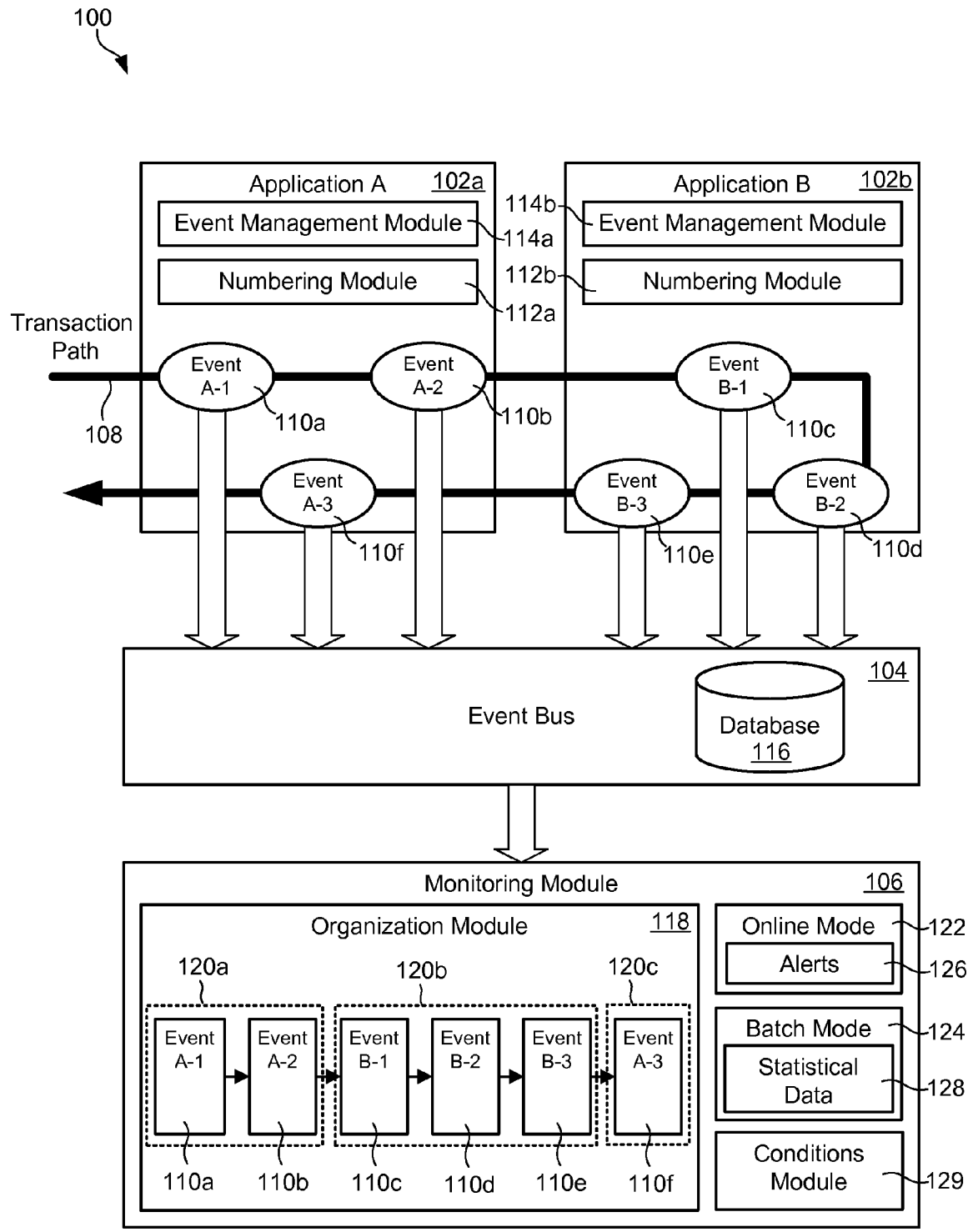
FIG. 1 is a high-level block diagram of a system for monitoring transactions requiring processing by multiple applications.

It will be readily understood that the components of the present invention, as generally described and illustrated in the Figures herein, may be arranged and designed in a wide variety of different configurations. Thus, the following more detailed description of the embodiments of the apparatus and methods of the present invention, as represented in the Figures, is not intended to limit the scope of the invention, as claimed, but is merely representative of selected embodiments of the invention.

Many of the functional units described in this specification have been represented as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, specific details may be provided, such as examples of programming, software modules, user selections, etc., to provide a thorough understanding of embodiments of the invention. One skilled in the relevant art will recognize, however, that the invention can be practiced without one or more of the specific details, or with other methods, components, etc. In other instances, well-known structures, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

Referring to FIG. 1, in selected embodiments, a system 100 for monitoring transactions requiring processing by multiple applications in an SOA or other similar architecture includes multiple applications 102a, 102b communicating by way of a TCP/IP protocol, an event bus 104, and a monitoring module 106. A transaction may follow a transaction path 108 through the applications 102a, 102b. For example, as shown in the illustrated embodiment, a first application 102a may receive an initial request to process a transaction, process part of the transaction, and then call a second application 102b internally. The second application 102b may then process another part of the transaction and return the result to the first application 102a, which may perform additional processing.

Along a transaction path 108, the applications 102a, 102b may be configured to generate one or more events 110a-f associated with the transaction. In certain embodiments, the applications 102a, 102b may be required to generate an event when each application 102a, 102b begins processing part of the transaction and an event when each application 102a, 102b ends processing part of the transaction. In other embodiments, these events 110a-b may be generated, for example, when an application 102a, 102b begins or ends processing a transaction or at any number of arbitrary points within the application 102a, 102b, as deemed advantageous by a developer. The events 110a-f and associated information may be output to and stored by an event bus 104.

A monitoring module 106 may be configured to receive the events 110a-f from the event bus 104 and organize them to provide an integrated end-to-end view of each transaction processed by the applications 102a, 102b. As will be explained in more detail hereafter, this end-to-end view may contain a list of events for each transaction. These events may include information such as, but not limited to, an IP address of an operating machine where an application 102a, 102b is running, an application ID, a transaction ID, a time stamp, a source IP address, a source port number, a target IP address, a target port number, or other event or transaction information. In cases where address conversion occurs between applications 102a, 102b, such as by a firewall, the monitoring module 106 may also retrieve and store conversion information in order to make an association between applications 102a, 102b processing a transaction. Those of skill in the art will recognize that while the present invention is described in relation to two applications 102a, 102b, the present invention may be used with more than two applications as well.

Because the system 100 may be used to log and track transactions from beginning to end across multiple applications, including the processing time between events, the system 100 may be useful in identifying bottlenecks or other performance issues within or between applications 102a, 102b. By combining this information with the failure log of an application 102a, 102b, it may also be easier to identify and correct errors or other problems associated with a particular transaction. For example, by comparing time stamps of events with error information in a failure log, it may be easier to recognize where errors have occurred in an application. In this way, event information generated by the present invention may be correlated with other types of information (e.g., failure logs) to provide more comprehensive information with respect to the performance of an application.

Various types of errors may be identified using the events from the event bus. For example, erroneous parameters values can be detected by examining events. Alternatively, analyzing the events permit quick identification of a transaction which incorrectly followed the wrong logic path through various applications. For example, events from applications that should have been included may be missing, or events for improper applications may be included in the events that are recorded.

In selected embodiments, each time an application 102a, 102b receives a request to process a transaction, a numbering module 112a, 112b associated with each application 102a, 102b may be called. This numbering module 112a, 112b may be used to generate a transaction ID for each transaction. In certain embodiments, a transaction ID may be generated by combining a request number with a thread ID associated with the request (e.g., <Request Number>+"@"+<Thread ID>). This allows a transaction to be correlated with a particular thread of execution to enable correlation with various types of debugging information. For example, a transaction may be correlated with Java dump or garbage collection information using the thread ID to assist in debugging. Similarly, by incorporating a request number into the transaction ID, issues related to simultaneous parallel processing of transactions and the order of processing of transactions may be dealt with more easily. By incorporating various types of information into the transaction ID, more comprehensive information can be obtained to aid in performance tuning and failure analysis.

In certain embodiments, the transaction ID may be screened from the business logic of an application. Thus, the transaction ID value may never appear in the parameters of a method or returned value associated with the processing of a transaction. This allows functional requirements (i.e., application requirements and related business requirements) to be isolated from non-functional requirements (i.e., system requirement not related to business requirements). Thus, information like the transaction ID may be screened from the business logic of the application and will not affect the business logic. This can increase productivity and provide easier maintenance.

In selected embodiments, each application 102a, 102b may have associated therewith an event management module 114a, 114b to acquire event information and deliver event information to the event bus 104. As mentioned above, in preferred embodiments, the event management module 114a, 114b captures and delivers event information such that regular inter-application calls are unaffected and thus need not be changed. In one embodiment, event information is stored and managed using the thread information for a transaction thread. In this manner, the benefits of the present invention can be realized without requiring changes to each application 102a, 102b for which event tracking is desired. The applications 102a, 102b may only need to provide minimal information (e.g., name of an event, content of an event, arbitrary information for the application, etc.) to an event management module 114a, 114b when calling an event delivery method. The event management module 114a, 114b, on the other hand, may be responsible for acquiring most event-related information, such as an IP address of the operating machine, an application name, a transaction ID, a time stamp, or the like. By allocating most of the event processing overhead to the event management module 114a, 114b, productivity and maintainability may be improved.

In certain embodiments, a call that generates an event is executed in a communication layer of the applications 102a, 102b. In one embodiment, these calls generate an event each time the application 102a begins processing a portion of the multi-application transaction and each time the application 102a finishes processing a portion of the multi-application transaction. Alternatively, a special call to an event generation method may be made by lines of source code within the applications 102a, 102b as determined by a software developer.

In certain embodiments, an event management module 114a, 114b may reference a property file storing information such as the name of an application 102a, 102b associated with the event management module 114a, 114b, connection information to the event bus 104, or the like. Settings of the event management module 114a, 114b may be changed simply by modifying the contents of the property file. This configuration may enable relatively easy transition between a test environment and real environment by changing the contents of the property file. Furthermore, this configuration enables the property file to be dynamically updated, allowing an event management module's settings to be changed without interrupting operation of the application 102a, 102b.

In certain embodiments, event information acquired by the event management module 114a, 114b may be stored and transmitted in the form of XML documents. This may allow customized applications in addition to the monitoring module 106 to be developed to retrieve the content of these XML documents and process the event information contained therein. In selected embodiments, arbitrary information which may be inherent to each application may be defined by a separate XML schema. In certain embodiments, an XML document storing this arbitrary information may be stored in an event catalogue database 116 as an additional event definition. Thus, not only event information, but arbitrary information inherent to an application may be packaged as an event. Accordingly, the monitoring module 106 along with other customized applications may be configured to process this additional arbitrary application information.

In selected embodiments, an event bus 104 may include software logic to receive and transmit events 110a-f and a database 116 to store the events 110a-f. Events 110a-f may be stored in the database 116 to prevent their loss as they travel between applications 102a, 102b and the monitoring module 106. This allows event data to be preserved in case the event bus 104 breaks down or ceases to operate. If and when the event bus 104 resumes operation, events 110a-f may be processed by the monitoring module 106 starting from the last successfully processed event. Furthermore, the database 116 may also provide an archive of past or arbitrary event information.

The event bus 104 may be designed to support multiple communication protocols (e.g., Web Services, HTTP, JMS, etc.) or the addition of communication protocols as necessary. Furthermore, the event bus 104 may be designed to support both synchronous (e.g., WebServices, HTTP, etc.) and asynchronous (e.g., JMS, etc.) connections to the applications 102a, 102b and monitoring module 106. For synchronous connections, the applications 102a, 102b may successfully transmit event information only when processing software logic of the event bus 104 is operating. Events 110a-f arriving to the event bus 104 over a synchronous connection are preferably immediately processed and stored. For asynchronous connections, the transmission of the event from the applications 102a, 102b succeeds regardless of whether the processing software logic of the event bus 104 is operating or not. Since the processing software logic of the event bus 104 may not be operating, events 110a-f arriving over an asynchronous connection may be queued or otherwise stored until the processing software logic of the event bus 104 is operational.

In certain embodiments, the monitoring module 106 may be configured to receive and process all events transmitted to and stored on the event bus 104. In other embodiments, the monitoring module 106 may be configured to receive and process only events that are of a certain type or meet a selected condition. For example, the monitoring module 106 may be configured to receive only events having a specific operating machine IP address, a specific transaction ID, or the like. Similarly, the monitoring module 106 may be configured to receive only certain types of events (e.g., only event A, only event B, etc.).

In certain embodiments, the monitoring module 106 may include an organization module 118 to organize events associated with a transaction. For example, the organization module 118 may be configured to collect events having the same operating machine IP address, application name, and transaction ID in an application 102a, 102b. These events may then be arranged according to their time stamps to create an event group 120a. Next, as will be explained in more detail in association with FIG. 2A, a process calling event of an event group 120a may be compared to a process receiving event of another event group 120b to verify correlation of event information. This information may include, for example, a source IP address, a source port number, a target IP address, and a target port number. If this information correlates, then the event groups 120a, 120b, 120c may be consolidated to form a single event group 120a-c. This process enables construction of an end-to-end view of one or more transactions.

By creating end-to-end views of transactions, various types of useful information may be obtained. For example, these views may be used to calculate the processing time between events; the average, maximum, and minimum processing times between events; the processing time for each transaction; the average, maximum, and minimum processing times for transactions; the transaction production rate over time; and the average, maximum, and minimum production rates over time. Furthermore, these views may be used to identify transactions whose processing time exceeds a specific duration, transactions whose processing time between selected events exceeds a specific duration, or the like. This information may be useful to identify conditions or locations associated with performance bottlenecks.

In certain embodiments, the monitoring module 106 may be designed to function in an online mode 122, a batch mode 124, or both. In an online mode 122, the monitoring module 106 may receive all events or only certain types of events from the event bus 104 by registering with the event bus 104. The event bus 104 may then send the selected events to the monitoring module 106 in real time. In a batch mode 124, the monitoring module 106 may also register with the event bus 104 but may only receive selected events from the event bus 104 at a specified or later time. In certain embodiments, an online mode 122 may be used to generate alerts 126 of various conditions or problems, allowing detection thereof in real time. These alerts 126 may take the form of an image, sound, light, email to a system administrator, entry in an alert log, call to other programs through a Web service, or the like.

In certain embodiments, the monitoring module 106 may include a conditions module 129 to define, set, or alter conditions which may trigger an alert. The conditions may not only be based upon the behavior of the applications but also on certain characteristics of the event itself. For example, conditions may be dynamically defined to trigger alerts based on the user_ID of the user conducting the multi-application transaction. The conditions module 129 may allow a user to dynamically define and set conditions that will trigger an alert as well as the level or type of alert triggered. This may allow alerts to be triggered based on the importance or priority of events. For example, an alert may be triggered where a transaction is performed by a particular user such as an executive or high-level manager. This may be accomplished by the conditions module 129 monitoring, for example, a user ID associated with a particular event.

In certain embodiments, based on the alerts generated by the conditions module 129, the monitoring module 106 may be configured to call external programs or systems outside of the monitoring module 106 through, for example, a Web service. For example, the monitoring module 106 may call an email program to notify a system administrator of an important or high priority event, such as an event associated with a transaction for an executive or high-level management user. The administrator may then respond in an appropriate manner. This capability to use both the conditions module 129 and external programs provides flexible operation and enables, for example, requests to be executed in order of priority, transmitted to a backup server, or the like.

In a batch mode 124, the monitoring module 106 may be configured to generate primarily statistical information. For example, by calculating the average processing time of transactions, it may be possible to ascertain the overall processing capability of an entire system using multiple applications. By calculating the average processing time between events, bottlenecks may be identified in applications or hardware to aid in performance tuning and hardware enhancement. By calculating the transaction processing rate, changes to the overall system load may be monitored and analyzed. Furthermore, by comparing the transaction processing time to the overall load of the system, the processing capability of the system under different loads may be calculated. Statistical information such as this may be useful in performing capacity planning and setting system operation policies for a system.

The monitoring module 106 may process not only event information, but also additional information inherent to each application which is stored in the event database 116. The event database 116 may be necessary for processing not only general event information, such as time stamps, but also application specific information, such as product ID or other relevant information defined by a developer. For example, by defining product ID as additional information, it may be easier to detect errors or problems which may occur when specific products are handled in transactions.

Referring to FIG. 2A, as previously mentioned, an event 110a may include various types of information to facilitate the creation of end-to-end views of transactions. For example, in certain embodiments, an event 110a may include one or more of an event name 200, event content 202, an IP address 204 of the operating machine, an application name 206, a transaction ID 208 in an application, a time stamp 210, arbitrary information 212 associated with an application, as well as other information 214 as needed.

Referring to FIG. 2B, in other situations, an event 110b may include additional information to provide a link between applications involved in a transaction. For example, event 110b may include a source IP address 216, a source port number 218, a target IP address 220, and a target port number 222 in addition to the information listed in FIG. 2A. In selected embodiments, the event 110b may be used when an application 120a calls another application 120b (i.e., a process calling event) or where one application 120b receives a request from another application 120a (i.e., a process receiving event). The event 110a illustrated in FIG. 2A, on the other hand, may be generated by processes occurring within an application that do not interact with other applications.

Referring to FIG. 3, as previously mentioned, in certain embodiments the monitoring module 106 may be configured to generate various alerts in response to various problems or conditions, such as when the monitoring module 106 is in an online mode 122. For example, an alert 126 may be generated where a time between events exceeds a selected time 300, or an average, maximum, or minimum time between events exceeds a selected time 302. An alert 126 may also be generated where a transaction processing time exceeds a selected time 304, or an average, maximum, or minimum transaction processing time exceeds a selected time 306. In other embodiments, an alert 126 may be generated where a transaction production rate falls below a selected rate 308; or an average, maximum, or minimum transaction production rate falls below a selected rate 310. Similarly, the monitoring module 106 may be configured to generate alerts 126 for many other conditions or problems 312 as needed.

Referring to FIG. 4, as mentioned previously, the monitoring module 106 may be configured to generate statistical data of events and transactions processed by the system 100, such as when the monitoring module 106 is in batch mode 124. For example, the monitoring module 106 may be configured to calculate the processing time 400 between events, or the average, maximum, or minimum processing times 402 between events. The monitoring module 106 may also be configured to calculate an individual transaction processing time 404 as well as the average, maximum, or minimum transaction processing times 406. In other embodiments, the monitoring module 106 may be configured to calculate a transaction production rate 408 or an average, maximum, or minimum transaction production rate 410. Similarly, the monitoring module 106 may be configured to calculate many other types of statistical data 412 as needed.

The present invention may be embodied in other specific forms without departing from its operating principles or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system to monitor transactions that require processing by multiple applications in communication by way of TCP/IP connections, the system comprising:
    a first application configured to process a first part of a TCP/IP-based transaction and to communicate a result of the first part of the TCP/IP-based transaction with other applications by way of a TCP/IP protocol, the first application generating a first event associated with the TCP/IP-based transaction, the first event comprising a transaction ID, the transaction ID identifying the event as associated with a specific transaction, the transaction ID comprising a request number and a thread ID, the thread ID associating the event with a specific application thread request, the request number distinguishing the first event from other events with a same thread ID in a simultaneous parallel processing system;
    a second application configured to process a second part of the TCP/IP-based transaction, the second application generating a second event associated with the TCP/IP-based transaction;
    a first event management module associated with the first application configured to acquire and deliver first event information associated with the first event;
    a second event management module associated with the second application configured to acquire and deliver second event information associated with the second event;
    an event bus in communication with the first and second event management modules to receive the first and second event information, the event bus comprising a data store to store the first and second event information, the event bus supporting both synchronous and asynchronous event transmission protocols; and
    a monitoring module in communication with the event bus to receive and organize the first and second event information to provide an integrated end-to-end view of the TCP/IP-based transaction processed by the first and second applications.

2. The system of claim 1, wherein the first and second event information is stored in XML documents.

3. The system of claim 1, wherein the first and second event information contain at least one of an event name, event content, an IP address of a machine processing the TCP/IP-based transaction, a name of an application associated with an event, a transaction ID, a time stamp, a source IP address, a source port number, a target IP address, a target port number, and other information about the application associated with the event.

4. The system of claim 1, wherein the event bus further comprises a storage device comprising the data store to store the first and second event information.

5. The system of claim 1, wherein the monitoring module is characterized by an online mode wherein the monitoring module monitors information on the event bus in real time.

6. The system of claim 5, wherein the monitoring module is further configured to generate a warning when at least one of a transaction exceeds a selected processing time, a selected event occurs, time between events exceeds a selected time, and a transaction processing rate exceeds a certain time.

7. The system of claim 1, wherein the monitoring module is characterized by a batch mode wherein the monitoring module generates statistical data of event information on the event bus over time.

8. The system of claim 7, wherein the statistical data comprises at least one of processing times between events, processing times for transactions, transaction processing rates over time, and transactions exceeding a certain processing time.

9. The system of claim 1, wherein the monitoring module receives information from the event bus by querying the event bus.

10. The system of claim 1, wherein the monitoring module is configured to generate the integrated end-to-end view by correlating at least one of a target IP address and a target port number of the first event information with at least one of a source IP address and a source port number of the second event information.

11. A computer program product to monitor transactions that require processing by multiple applications, the program product comprising a computer-readable medium storing a computer-readable program that when executed on a computer causes the computer to:
   process, by a first application by way of a processor, a first part of a TCP/IP-based transaction, the first application generating a first event associated a staff of the first part and a second event associated with an end of the first part, the first event comprising a transaction ID, the transaction ID identifying the event as associated with a specific transaction, the transaction ID comprising a request number and a thread ID, the thread ID associating the event with a specific application thread request, the request number distinguishing the first event from other events with a same thread ID in a simultaneous parallel processing system;
   process, by a second application, a second part of the TCP/IP-based transaction, the second application generating a third event associated a start of the second part and a fourth event associated with an end of the second part;
   acquire first and second event information associated with the first and second events;
   acquire third and fourth event information associated with the third and fourth events;
   transmit the first, second, third, and fourth event information to an event bus, the event bus comprising a data store to store the first and second event information, the event bus supporting both synchronous and asynchronous event transmission protocols;
   receive the first, second, third and fourth event information from the event bus and organize the first, second, third and fourth event information to provide an integrated end-to-end view of the TCP/IP-based transaction processed by the first and second applications.

12. The computer program product of claim 11, wherein the first, second, third, and fourth event information is stored in XML documents.

13. The computer program product of claim 11, wherein the first, second, third, and fourth event information contain at least one of an event name, event content, an IP address of a machine processing the TCP/IP-based transaction, a name of an application associated with an event, a transaction ID, a time stamp, a source IP address, a source port number, a target IP address, a target port number, and other information about an application associated with an event.

14. The computer program product of claim 11, further comprising storing, by the event bus, the first, second, third, and fourth event information.

15. The computer program product of claim 11, further comprising monitoring information on the event bus in real time.

16. The computer program product of claim 15, further comprising generating a warning when at least one of a transaction exceeds a selected processing time, a selected event occurs, time between events exceeds a selected time, and a transaction processing rate exceed a selected time.

17. The computer program product of claim 11, further comprising generating statistical data of information on the event bus over time.

18. The computer program product of claim 17, wherein the statistical data comprises at least one of processing times between events, processing times for transactions, transaction processing rates over time, and transactions exceeding a certain processing time.

19. The computer program product of claim 11, further comprising querying the event bus to receive the first, second, third, and fourth event information from the event bus.

20. A method to monitor transactions that require processing by multiple applications, the method comprising:
   processing, by a first application, a first part of a TCP/IP-based transaction, the first application generating a first event associated with the TCP/IP-based transaction, the first application communicating a result of the first part of the TCP/IP-based transaction with other applications by way of a TCP/IP protocol, the first event comprising a transaction ID, the transaction ID identifying the event as associated with a specific transaction, the transaction ID comprising a request number and a thread ID, the thread ID associating the event with a specific application thread request, the request number distinguishing the first event from other events with a same thread ID in a simultaneous parallel processing system;
   processing, by a second application, a second part of the TCP/IP-based transaction, the second application generating a second event associated with the TCP/IP-based transaction, wherein the first and second event information is stored in XML documents;
   acquiring first event information associated with the first event;
   acquiring second event information associated with the second event;
   transmitting the first and second event information to an event bus, the event bus comprising a data store to store the first and second event information, the event bus supporting both synchronous and asynchronous event transmission protocols; and
   receiving the first and second event information from the event bus and organizing the first and second event information to provide an integrated end-to-end view of the TCP/IP-based transaction processed by the first and second applications; and
   monitoring information on the event bus in real time and triggering an alert in response to one or more predefined conditions being satisfied according to information associated with the integrated end-to-end view of the TCP/IP-based transaction.

* * * * *